June 12, 1934.  T. T. BAKER ET AL  1,962,679
FILM FOR COLOR PHOTOGRAPHY
Filed May 13, 1933
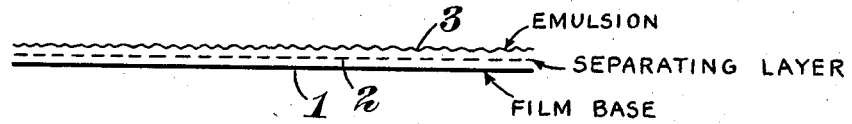
INVENTORS
T. T. Baker,
C. Bonamico
& R. A. S. Grist
By Watson, Coit, Moise & Grindle
ATT'YS.

Patented June 12, 1934

1,962,679

UNITED STATES PATENT OFFICE 1,962,679

FILM FOR COLOR PHOTOGRAPHY

Thomas Thorne Baker and Charles Bonamico, London, and Ralph Alfred Sidney Grist, Ickleton, Cambridge, England, assignors to Dufaycolor Ltd., London, England, a British company Application May 13, 1933, Serial No. 670,976
In Great Britain May 18, 1932

5 Claims. (Cl. 95—2)

This invention consists of improvements in or relating to films for color photography and color cinematography, and has particular reference to films of the multi-color screen type. Films of this type usually consist of a film base of a cellulose ester or ether to which the color screen is applied by the action of dyes and the emulsion is then applied to the color screen. It has been found, however, that difficulties arise when the emulsion is applied direct to the color screen since the dyes of the screen diffuse into the emulsion.

It has previously been proposed to apply a separating layer (e. g. gelatine or varnish or both) between the screen and the emulsion.

According to the present invention a method is provided for protecting the sensitive emulsion coated on top of the color screen of a photographic film of the multi-color screen type from the action of the dyes of the color screen which comprises applying a separating layer of a synthetic resin in solution to the color screen and then applying the emulsion on to said layer. Preferably the separating layer is applied in the form of a solution of a phenol-formaldehyde condensation product (e. g. the product known under the registered trade name of "Bakelite") in benzole to which may be added a plasticizer such as linseed oil. The separating layer is preferably applied to a thickness of about 4μ.

The invention includes a photographic film when made according to the above method.

In a specific example of the invention illustrated in the accompanying drawing, a multi-color screen is applied to a cellulose acetate film (1) by the method described in U. S. Patent No. 1,805,361 or in U. S. Patent No. 1,826,001. A separating layer (2) of a synthetic resin dissolved in benzole to which a percentage of linseed oil or plasticizer has been added is applied and allowed to dry, and the sensitive emulsion (3) is then applied to the separating layer.

It is found that the separating layer of synthetic resin prevents the dyes of the color screen diffusing into the emulsion and also provides effective adhesion between the emulsion and the color screen.

We claim:—

1. A film for use in color photography by the color screen method comprising a cellulose acetate film base, a layer of collodion dyed to form a color screen on said base, a separating layer comprising a synthetic resin on said collodion layer and a sensitive emulsion on said separating layer.

2. A film for use in color photography by the color screen method comprising a cellulosic film base having one surface dyed to form a color screen, a separating layer comprising a synthetic resin on said color screen and a sensitive emulsion on said separating layer.

3. A film for use in color photography by the color screen method comprising a cellulosic film base, a color screen on said base, a separating layer comprising a phenol-formaldehyde condensation product on said color screen and a sensitive emulsion on said separating layer.

4. A film for use in color photography by the color screen method comprising a cellulosic film base, a color screen on said base, a separating layer comprising a synthetic resin and a plasticizer on said screen and a sensitive emulsion on said layer.

5. A film for use in color photography by the color screen method comprising a cellulosic film base, a layer of cellulosic material different from that of the film base and dyed to form a color screen, a separating layer comprising a synthetic resin on said cellulosic layer and a sensitized gelatine emulsion on said separating layer.

THOMAS THORNE BAKER.
CHARLES BONAMICO.
RALPH ALFRED SIDNEY GRIST.